US012518890B2

(12) United States Patent
Zhang et al.

(10) Patent No.: US 12,518,890 B2
(45) Date of Patent: Jan. 6, 2026

(54) FLAME-RETARDANT POLYMERIC COMPOSITIONS

(71) Applicants: Dow Global Technologies LLC, Midland, MI (US); Rohm and Haas Company, Collegeville, PA (US)

(72) Inventors: Yichi Zhang, Novi, MI (US); Bharat I. Chaudhary, Princeton, NJ (US); Santosh S. Bawiskar, Sugar Land, TX (US); Xindi Yu, Paoli, PA (US); Qian Gou, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 146 days.

(21) Appl. No.: 17/908,339

(22) PCT Filed: Jun. 7, 2021

(86) PCT No.: PCT/US2021/036085
§ 371 (c)(1),
(2) Date: Aug. 31, 2022

(87) PCT Pub. No.: WO2021/252312
PCT Pub. Date: Dec. 16, 2021

(65) Prior Publication Data
US 2023/0086641 A1 Mar. 23, 2023

Related U.S. Application Data

(60) Provisional application No. 63/036,177, filed on Jun. 8, 2020.

(51) Int. Cl.
*H01B 3/44* (2006.01)
*C08G 77/442* (2006.01)
*C08K 3/22* (2006.01)
*C09K 21/02* (2006.01)
*H01B 7/295* (2006.01)

(52) U.S. Cl.
CPC ............ *H01B 3/441* (2013.01); *C08G 77/442* (2013.01); *C08K 3/22* (2013.01); *C09K 21/02* (2013.01); *H01B 7/295* (2013.01); *C08K 2003/2224* (2013.01)

(58) Field of Classification Search
None
See application file for complete search history.

(56) References Cited

U.S. PATENT DOCUMENTS

| 3,646,155 | A | 2/1972 | Scott |
| 4,500,648 | A | 2/1985 | Malpass |
| 4,574,133 | A | 3/1986 | Umpleby |
| 4,798,081 | A | 1/1989 | Hazlitt et al. |
| 5,002,996 | A | 3/1991 | Okuda et al. |
| 5,741,858 | A | 4/1998 | Brann et al. |
| 5,986,028 | A | 11/1999 | Lai et al. |
| 6,048,935 | A * | 4/2000 | Penfold ................. H01B 3/441 522/120 |
| 2002/0001715 | A1* | 1/2002 | Redondo ................ H01B 3/441 524/436 |
| 2002/0143114 | A1 | 10/2002 | Barioz |
| 2010/0163272 | A1* | 7/2010 | Inagaki .................... H01B 3/44 174/110 SR |
| 2010/0209705 | A1* | 8/2010 | Lin ........................ C08L 51/06 524/424 |
| 2012/0241190 | A1* | 9/2012 | Shimada ................ H01B 7/292 524/93 |
| 2013/0199820 | A1* | 8/2013 | Dahlen ..................... H01B 7/02 174/110 SR |
| 2014/0295186 | A1* | 10/2014 | Fossum .................. H01B 3/441 428/391 |
| 2014/0329090 | A1* | 11/2014 | Dahlen ................ C08K 5/0091 525/274 |
| 2016/0251535 | A1* | 9/2016 | Chaudhary ............ H01B 3/441 428/447 |
| 2017/0121514 | A1* | 5/2017 | Chaudhary .......... C08L 23/0846 |
| 2017/0240672 | A1* | 8/2017 | Costa .................. H01L 31/0481 |
| 2017/0250002 | A1* | 8/2017 | Shimada ............... C08F 255/02 |
| 2018/0362793 | A1* | 12/2018 | Li ..................... C09D 123/0892 |
| 2019/0309117 | A1 | 10/2019 | Zhang et al. |

FOREIGN PATENT DOCUMENTS

| EP | 0842978 | 5/1998 |
| JP | 2002356590 | 12/2002 |
| JP | 2008280517 | 11/2008 |

(Continued)

OTHER PUBLICATIONS

Ghosh-Dastidar—effect of Silane_Grafting_Level_on properties—3Intern'l.Wire & Cable Symp.+Cite—2008 (Year: 2008).*
Sener—magnesium hydroxide as flame retardant in cross-linked PE—Mat.& Design—2008 (Year: 2008).*
Sigma-Aldrich—vinyl trimethoxy silane—MW—Jun. 28, 2024 (Year: 2024).*
Matsumura—WO 2018-180689 A1—MT—silane graft PE+flame retard—2018 (Year: 2018).*
Hussein—Melt flow index as f(temp)—J.Appl. Poly.Sci.—2003 (Year: 2003).*
Engineering ToolBox—Universal Gas Constant—Dec. 2, 2024 (Year: 2024).*
Fujita—WO 2016-084613 A1—MT—insulation for wire—silicone+amount+motivation—2016 (Year: 2016).*

(Continued)

*Primary Examiner* — John Vincent Lawler
(74) *Attorney, Agent, or Firm* — Mark A. Twilley

(57) ABSTRACT

A polymeric composition includes 10 wt % to 80 wt % of a silane-grafted ethylene polymer based on a total weight of the polymeric composition. The silane-grafted ethylene polymer has a silane content of 0.40 mol % to 1.50 mol % based on a total moles of the silane-grafted ethylene polymer and the ethylene polymer used to make the silane-grafted ethylene polymer has a polar comonomer content of less than 15 wt % based on a total weight of the ethylene polymer. The polymeric composition also includes 10 wt % to 80 wt % of a flame-retardant filler based on a total weight of the polymeric composition.

14 Claims, No Drawings

(56) References Cited

FOREIGN PATENT DOCUMENTS

| | | | |
|---|---|---|---|
| WO | WO-2016084613 A1 * | 6/2016 | ............. C08L 23/02 |
| WO | WO 2017/218280 A1 * | 12/2017 | ............. H01B 3/44 |
| WO | WO-2018180689 A1 * | 10/2018 | ............... C08F 8/42 |
| WO | WO-2019027955 A1 * | 2/2019 | ............. H01B 3/44 |
| WO | 2020006130 | 1/2020 | |

OTHER PUBLICATIONS

Williams, Journal of Polymer Science, Polymer Letters, 1968, vol. 6, p. 621.
Office Action from corresponding Japanese Application No. 2022-567446 dated May 2, 2025.

\* cited by examiner

FLAME-RETARDANT POLYMERIC COMPOSITIONS

BACKGROUND

Field of the Disclosure

The present disclosure relates to polymeric compositions, and more specifically to flame-retardant polymeric compositions.

INTRODUCTION

Polymeric compositions utilizing a polyolefin and a flame-retardant material, halogenated flame-retardant or halogen free flame-retardant (HFFR), are useful for forming insulation and jacketing of coated conductors used in applications where flame-retardancy is important. Halogen free flame-retardancy is typically achieved through the addition of hydrated mineral fillers in the formulation that dilute the concentration of flammable polyolefin material and decompose at or below a degradation temperature of the polymer when exposed to heat. The decomposition of the hydrated mineral filler releases water that removes heat, one of the key contributors to a fire (the others being fuel and oxygen). Traditional HFFR containing polymeric compositions are used in buildings, trains, cars, or wherever people may be present.

The use of HFFR in polymeric compositions suffers from a number of drawbacks, the majority of which stem from the relatively high level of HFFR necessary to meet fire retardant specifications. HFFR loadings of 60 weight percent or 65 weight percent in polyolefins are not uncommon. This loading of HFFR negatively affects the density, flexibility, and mechanical properties of coated conductors using the polymeric composition.

One approach to addressing the issues related to high HFFR loadings is to use silane-grafted polyolefin elastomers as a carrier polyolefin for the HFFR. For example, WO2017218280A1 ("the '280 publication") discloses the use of a polymeric composition comprising silane-grafted polyolefin elastomers and HFFR with the elastomer having a wide range of silane concentrations. However, the use of silane-grafted polyolefin elastomers with HFFR presents its own complications. For example, the chemistry between silane and the hydroxyl groups/moisture in HFFR is not fully understood and avoiding premature crosslinking is difficult. Further, the effect of grafted silane on the burn performance of cables made with polymeric compositions comprising HFFR is uncertain and the '280 publication is silent regarding cable (coated conductor or insulated wire) burn performance.

Given the uncertain nature of cable burn performance based on silane concentration and high HFFR loading, it would be surprising to discover a critical silane concentration range for a silane-grafted ethylene polymer in a polymeric composition that maximizes the burn performance of a coated conductor made with the composition.

SUMMARY OF THE DISCLOSURE

The present disclosure provides a polymeric composition that has a critical silane concentration range for a silane-grafted ethylene polymer that maximizes the burn performance of a coated conductor made with the polymeric composition.

The inventors of the present application have discovered that a polymeric composition comprising a silane-grafted ethylene polymer having a grafted silane content of 0.40 mol % to 1.50 mol % based on a total moles of the silane-grafted ethylene polymer, a flame-retardant material, optionally a silicone, optionally an antioxidant and optionally a silanol condensation catalyst can be used to form a coated conductor that exhibits a passing Filler Weighted Char Length ("FWCL") value as described in greater detail below.

It is important to evaluate the burn performance of coated conductors with high flame-retardant loadings, particularly high HFFR loadings, with a view to attaining desired cable burn performance while minimizing any loss in mechanical properties of the polymeric composition as a result of high flame-retardant loading. One method of determining the burn performance of a coated conductor utilizing a polymeric composition having a high flame-retardant loading is to measure the efficacy of the flame-retardant in decreasing the length of char formed in an International Electrotechnical Commission test 60332-1-2:2004, using the FWCL criterion. Generally, a value less than 15 cm*%=for the FWCL criterion is considered desirable. The inventors of the present invention have surprisingly discovered that the measured FWCL value is a function of the silane concentration of a silane-grafted ethylene polymer used to make the polymeric composition having a high flame-retardant loading. Further surprisingly discovered is that a critical grafted silane content of 0.40 mol % to 1.50 mol % based on a total moles of the silane-grafted ethylene polymer allows coated conductors formed from high flame-retardant loading polymeric compositions to exhibit values of less than 15 cm*% for the FWCL criterion.

The polymeric compositions of the present invention are particularly useful in making coated conductors.

According to a first feature of the present disclosure, a polymeric composition includes 10 wt % to 80 wt % of a silane-grafted ethylene polymer based on a total weight of the polymeric composition, wherein silane-grafted ethylene polymer has a silane content of 0.40 mol % to 1.50 mol % based on a total moles of the silane-grafted ethylene polymer and the ethylene polymer used to make the silane-grafted ethylene polymer has a polar comonomer content of less than 15 wt % based on a total weight of the ethylene polymer; and 10 wt % to 80 wt % of a flame-retardant filler based on a total weight of the polymeric composition.

According to a second feature of the present disclosure polymeric composition further comprises one or more of: 1 wt % to 5 wt % silicone based on a total weight of the polymeric composition; and 0.001 wt % to 10.0 wt % of a silanol condensation catalyst based on a total weight of the polymeric composition.

According to a third feature of the present disclosure, the silane-grafted ethylene polymer has a silane content of 0.40 mol % to 0.94 mol % based on a total moles of the silane-grafted ethylene polymer.

According to a fourth feature of the present disclosure, the silane-grafted ethylene polymer has a density of 0.860 g/cc to 0.930 g/cc as measured according to ASTM D-792, According to a fifth feature of the present disclosure, the flame-retardant filler is a halogen free flame-retardant filler.

According to a sixth feature of the present disclosure, the silane graft of the silane-grafted ethylene polymer is a unit derived from a hydrolysable silane monomer of structure (I) in which $R^1$ is a hydrogen atom or methyl group; x is 0 or 1; n is an integer from 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl.

According to a seventh feature of the present disclosure, the hydrolysable silane is selected from the group consisting of vinyltrimethoxy silane and vinyltriethoxy silane.

According to an eighth feature of the present disclosure, the flame-retardant filler comprises at least one of magnesium hydroxide, aluminum trihydrate, calcium carbonate, hydrated calcium silicate and hydrated magnesium.

According to a ninth feature of the present disclosure, a coated conductor, comprising: a conductor; and the polymeric composition of any of features 1-8 positioned at least partially around the conductor, wherein the coated conductor exhibits a Filler Weighted Char Length criterion value of less than 15 cm*%.

According to a tenth feature of the present disclosure the Filler Weighted Char Length criterion value of the coated conductor is from 1 cm*% to 10 cm*%.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

All ranges include endpoints unless otherwise stated.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

As used herein, the term weight percent ("wt %") designates the percentage by weight a component is of a total weight of the polymeric composition unless otherwise indicated. The term mole percent ("mol %") designates the percentage by moles a component is of a total moles of the item in which the component is present.

Unless otherwise provided herein, density is measured in accordance with ASTM D792, Method B. The result is recorded in grams (g) per cubic centimeter (g/cc).

Unless otherwise provided herein, a melt index (MI) is measured in accordance with ASTM D1238, Condition 190° C./2.16 kilogram (kg) weight and is reported in grams eluted per 10 minutes (g/10 min).

"Polymer" means a polymeric compound prepared by polymerizing monomers, whether of the same or a different type. The generic term polymer thus embraces the terms homopolymer, interpolymer and copolymer.

"Ethylene polymer" means a polymer containing units derived from ethylene. Ethylene polymers typically comprises at least 50 mol % units derived from ethylene. Polyethylene is an ethylene polymer.

Polymeric Composition

The present disclosure is directed to a polymeric composition. The polymeric composition comprises a silane-grafted ethylene polymer and a flame-retardant filler. The polymeric composition may also comprise silicone. As will be explained in greater detail below, the polymeric composition may be used in the manufacture of a coated conductor.

Ethylene Polymer

"Silane-grafted ethylene polymer", "silane-grafted polyethylene", "Si-g-PE" and like terms means an ethylene polymer prepared by a process of grafting a silane functionality onto a backbone of an ethylene polymer as described, for example, in U.S. Pat. No. 3,646,155 or U.S. Pat. No. 6,048,935.

The ethylene polymer (that the silane-grafted ethylene polymer is formed from) may comprise 50 mol % or greater, 60 mol % or greater, 70 mol % or greater, 80 mol % or greater, 85 mol % or greater, 90 mol % or greater, or 91 mol % or greater, or 92 mol % or greater, or 93 mol % or greater, or 94 mol % or greater, or 95 mol % or greater, or 96 mol % or greater, or 97 mol % or greater, or 97.5 mol % or greater, or 98 mol % or greater, or 99 mol % or greater, while at the same time, 100 mol % or less, 99.5 mol % or less, or 99 mol % or less, or 98 mol % or less, or 97 mol % or less, or 96 mol % or less, or 95 mol % or less, or 94 mol % or less, or 93 mol % or less, or 92 mol % or less, or 91 mol % or less, or 90 mol % or less, or 85 mol % or less, or 80 mol % or less, or 70 mol % or less, or 60 mol % or less of ethylene as measured using Nuclear Magnetic Resonance (NMR) or Fourier-Transform Infrared (FTIR) Spectroscopy. Other units of the ethylene polymer may include $C_3$ to $C_4$, or $C_6$, or $C_8$, or $C_{10}$, or $C_{12}$, or $C_{16}$, or $C_{18}$, or $C_{20}$ α-olefins, such as propylene, 1-butene, 1-hexene, 4-methyl-1-pentene, and 1-octene. Other units of the ethylene polymer (that the silane-grafted ethylene polymer is formed from) may be derived from one or more polymerizable monomers including, but not limited to, polar monomers such as unsaturated esters. The unsaturated esters may be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates include, but are not limited to, vinyl acetate, vinyl propionate, and vinyl butanoate.

The ethylene polymer that the silane-grafted ethylene polymer is formed from may be an ultra-low-density polyethylene or a linear low-density polyethylene or a high-density polyethylene or an ethylene ethyl acrylate copolymer or an ethylene vinyl acetate copolymer. The density of the ethylene polymer may be 0.860 g/cc or greater, 0.870 g/cc or greater, or 0.880 g/cc or greater, or 0.890 g/cc or greater, or 0.900 g/cc or greater, or 0.904 g/cc or greater, or 0.910 g/cc or greater, or 0.915 g/cc or greater, or 0.920 g/cc or greater, or 0.921 g/cc or greater, or 0.922 g/cc or greater, or 0.925 g/cc to 0.930 g/cc or greater, or 0.935 g/cc or greater, while at the same time, 0.970 g/cc or less, or 0.960 g/cc or less, or 0.950 g/cc or less, or 0.940 g/cc or less, or 0.935 g/cc or less, or 0.930 g/cc or less, or 0.925 g/cc or less, or 0.920 g/cc or less, or 0.915 g/cc or less, or 0.910 g/cc or less, or 0.905 g/cc or less, or 0.900 g/cc or less as measured by ASTM D792.

The melt index of the ethylene polymer may be 0.5 g/10 min or greater, or 1.0 g/10 min or greater, or 1.5 g/10 min or greater, or 2.0 g/10 min or greater, or 2.5 g/10 min or greater, or 3.0 g/10 min or greater, or 3.5 g/10 min or greater, or 4.0 g/10 min or greater, or 4.5 g/10 min or greater, or 10.0 g/10 min or greater, or 18 g/10 min or greater, while at the same time, 30.0 g/10 min or less, or 25.0 g/10 min or less, or 20.0 g/10 min or less, or 18.0 g/10 min or less, or 15.0 g/10 min or less, or 10.0 g/10 min or less, or 5.0 g/10 min or less, or 4.5 g/10 min or less, or 4.0 g/10 min or less, or 3.5 g/10 min or less, or 3.0 g/10 min or less, or 2.5 g/10 min or less, or 2.0 g/10 min or less, or 1.5 g/10 min or less, or 1.0 g/10 min or less.

The ethylene polymer may be a homogeneous polymer or homopolymer. Homogeneous ethylene polymers may have a polydispersity index (i.e., molecular weight distribution) in the range of 1.5 to 3.5 and a substantially uniform comonomer distribution, and are characterized by a single and relatively low melting point as measured by a differential scanning calorimetry (DSC). Substantially linear ethylene copolymers (SLEP) are homogeneous ethylene polymers.

As here used, "substantially linear" means that the bulk polymer is substituted, on average, with about 0.01 long-chain branches/1000 total carbons (including both backbone and branch carbons) to about 3 long-chain branches/1000 total carbons, preferably from about 0.01 long-chain branches/1000 total carbons to about 1 long-chain branch/1000 total carbons, more preferably from about 0.05 long-chain branches/1000 total carbons to about 1 long-chain branch/1000 total carbons, and especially from about 0.3 long chain branches/1000 total carbons to about 1 long chain branches/1000 total carbons.

"Long-chain branches" or "long-chain branching" (LCB) means a chain length of at least one (1) carbon less than the number of carbons in the comonomer, as opposed to "short chain branches" or "short chain branching" (SCB) which means a chain length two (2) less than the number of carbons in the comonomer. For example, an ethylene/1-octene substantially linear polymer has backbones with long chain branches of at least seven (7) carbons in length, but it also has short chain branches of only six (6) carbons in length, whereas an ethylene/1-hexene substantially linear polymer has long chain branches of at least five (5) carbons in length but short chain branches of only four (4) carbons in length. LCB can be distinguished from SCB by using $^{13}C$ nuclear magnetic resonance (NMR) spectroscopy and to a limited extent, e.g. for ethylene homopolymers, it can be quantified using the method of Randall (*Rev. Macromol. Chem. Phys.*, C29 (2&3). p. 285-297). However, as a practical matter, current $^{13}C$ NMR spectroscopy cannot determine the length of a long-chain branch in excess of about six (6) carbon atoms and as such, this analytical technique cannot distinguish between a seven (7) and a seventy (70) carbon branch. The LCB can be about as long as about the same length as the length of the polymer backbone.

U.S. Pat. No. 4,500,648 teaches that LCB frequency can be represented by the equation $LCB=b/M_w$ in which b is the weight average number of LCB per molecule and $M_w$ is the weight average molecular weight. The molecular weight averages and the LCB characteristics are determined by gel permeation chromatography (GPC) and intrinsic viscosity methods.

One measure of the SCB of an ethylene copolymer is its short chain branch distribution index (SCBDI), also known as composition distribution branch index (CDBI), which is defined as the weight percent of the polymer molecules having a comonomer content within 50 percent of the median total molar comonomer content. The SCBDI or CDBI of a polymer is readily calculated from data obtained from techniques know in the art, such as temperature rising elution fractionation (TREF) as described, for example. in Wild et al. *Journal of Polymer Science*, Poly. Phys. Ed., Vol. 20, p. 441 (1982). or as described in U.S. Pat. No. 4,798,081. The SCBDI or CDBI for the substantially linear ethylene polymers useful in the present invention is typically greater than about 30 wt %, or 50 wt %, or 80 wt %, or 90 wt %.

"Polymer backbone" or just "backbone" means a discrete molecule, and "bulk polymer" or just "polymer" means the product that results from a polymerization process and for substantially linear polymers, that product may include both polymer backbones having LCB and polymer backbones without LCB. Thus a "bulk polymer" includes all backbones formed during polymerization. For substantially linear polymers, not all backbones have LCB but a sufficient number do such that the average LCB content of the bulk polymer positively affects the melt rheology (i.e. the melt fracture properties).

SLEP and their method of preparation are more fully described in U.S. Pat. Nos. 5,741,858 and 5,986,028.

The polydispersity index is calculated as Mw/Mn. Mw is defined as weight average molecular weight and Mn is defined as number average molecular weight. The polydispersity index is measured according to the following technique: The polymers are analyzed by gel permeation chromatography (GPC) on a Waters 150° C. high temperature chromatographic unit equipped with three linear mixed bed columns (Polymer Laboratories (10 micron particle size)), operating at a system temperature of 140° C. The solvent is 1,2,4-trichlorobenzene from which about 0.5% by weight solutions of the samples are prepared for injection. The flow rate is 1.0 milliliter/minute (mm/min) and the injection size is 100 microliters (μl). The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968, incorporated herein by reference) to derive the equation:

$$Mpolyethylene=(a)(Mpolystyrene)^b$$

In this equation, a=0.4316 and b=1.0. Weight average molecular weight, Mw, is calculated in the usual manner according to the formula:

$$Mw=\Sigma(w_i)(M_i)$$

in which $w_i$ and Mi are the weight fraction and molecular weight respectively of the $i^{th}$ fraction eluting from the GPC column. Generally, the Mw of the ethylene polymer ranges from 42,000 to 64,000, preferably 44,000, to 61,000, and more preferably 46,000 to 55,000.

Typical catalyst systems for preparing homogeneous ethylene polymers include metallocene and constrained geometry catalyst (CGC) systems. CGC systems are used to prepare SLEP.

The ethylene polymer may be a copolymer of ethylene and one or more alpha-olefins (α-olefins) having 3 to 12 carbon atoms or from 3 to 8 carbon atoms. The α-olefin may be one or more of 1-butene, 1-hexene and 1-octene. The ethylene polymers can comprise units derived from three or more different monomers. For example, a third comonomer can be another α-olefin or a diene such as ethylidene norbornene, vinyl norbornene, butadiene, 1,4-hexadiene or a dicyclopentadiene or a polar material such as an unsaturated ester. The ethylene polymer used to make the silane-grafted ethylene polymer may have a polar comonomer content of less than 15 wt %, or 10 wt %, or 5 wt % or less, or 3 wt % or less, or 1 wt % or less, or 0 wt % based on the total weight of the ethylene polymer. An exemplary polar comonomer is ethyl acrylate.

Specific examples of the ethylene polymers useful in this invention include homogeneously branched, linear ethylene/alpha-olefin copolymers (e.g. TAFMER™. by Mitsui Petrochemicals Company Limited and EXACT™ by Exxon Chemical Company); and homogeneously branched, substantially linear ethylene/alpha-olefin polymers (e.g. AFFINITY™ plastomers and ENGAGE™ elastomers available from The Dow Chemical Company.

Hydrolysable Silane Monomer

A "hydrolysable silane monomer" is grafted to the ethylene polymer to produce the silane-grafted ethylene polymer. Any hydrolysable silane or a mixture of such hydrolysable silanes that will effectively graft to the ethylene polymer (and thus enable subsequent crosslinking of the silane-grafted ethylene polymer) can be used. A representative, but not limiting, example of a hydrolysable silane monomer has structure (I):

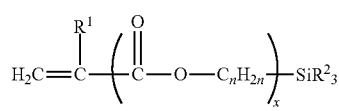

Structure (I)

in which $R^1$ is a hydrogen atom or methyl group; x is 0 or 1; n is an integer from 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl.

The hydrolysable silane monomer may include silane monomers that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Hydrolyzable groups may include methoxy, ethoxy, formyloxy, acetoxy, proprionyloxy, and alkyl or arylamino groups. In a specific example, the hydrolyzable silane monomer is an unsaturated alkoxy silane, which can be grafted onto the ethylene polymer. Examples of hydrolysable silane monomers include vinyltrimethoxysilane (VTMS), vinyltriethoxysilane (VTES), vinyltriacetoxysilane, and gamma-(meth)acryloxy propyl trimethoxy silane. In context to Structure (I), for VTMS: x=0; $R^1$=hydrogen; and $R^2$=methoxy; for VTES: x=0; $R^1$=hydrogen; and $R^2$=ethoxy; and for vinyl-triacetoxysilane: x=0; $R^1$=H; and $R^2$=acetoxy.

Free Radical Initiator

The hydrolysable silane monomer may be grafted to the ethylene polymer, to form a Si-g-PE, through the use of a free radical initiator. Examples of free radical initiators include a peroxide, an azo compound (i.e., compounds bearing a diazinyl moiety), and/or by ionizing radiation. The free radical initiator may be an organic peroxide such as dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and t-butyl peracetate. An example of an azo compound is azobisisobutyronitrile.

The amount of initiator used may be 0.04 wt % or greater or 0.06 wt % or greater, while at the same time, 1.00 wt % or less, or 0.50 wt % or less, or 0.30 wt % or less, or 0.15 wt % or less or 0.10 wt % or less based on a total weight of the combined ethylene polymer, hydrolysable silane monomer and initiator. The weight ratio of hydrolysable silane monomer to initiator may be from 5:1 to 70:1 or from 10:1 to 30:1. With certain polymers with unsaturation it may be possible to graft without any initiator at all using radicals generated by heat and shear.

Silane Grafting of the Ethylene Polymer

Typically, the ethylene polymer is grafted with the hydrolysable silane monomer prior to mixing the silane-grafted ethylene polymer (Si-g-PE) with the flame-retardant filler. Alternatively, an in-situ Si-g-PE is formed by a process such as the MONOSIL process, in which a hydrolysable silane monomer is grafted onto the backbone of an ethylene polymer during the extrusion of the polymeric composition to form a coated conductor, as described, for example, in U.S. Pat. No. 4,574,133. The ethylene polymer, hydrolysable silane monomer and free radical initiator are mixed using known equipment and techniques and subjected to a grafting temperature of from 120° C. to 270° C. Typically, the mixing equipment is either a BANBURY™ mixer or similar mixer, or a single or twin-screw extruder. Other extruders like counter-rotating twin screw extruders, kneaders, planetary extruders, multi-screw extruders may also be used. A combination of two or more of the above-mentioned mixers or extruders in tandem may also be used.

Silane-Grafted Ethylene Polymer

The silane-grafted ethylene polymers have the same density ranges as those of the pre-grafted ethylene polymers described above. The melt index of the silane-grafted ethylene polymer may be 0.1 g/10 min or greater, or 0.3 g/10 min or greater, or 0.5 g/10 min or greater, or 1.0 g/10 min or greater, or 1.5 g/10 min or greater, or 2.0 g/10 min or greater, or 2.5 g/10 min or greater, or 3.0 g/10 min or greater, or 3.5 g/10 min or greater, or 4.0 g/10 min or greater, or 4.5 g/10 min or greater, or 10.0 g/10 min or greater, or 18 g/10 min or greater, or 20 g/10 min or greater, or 30 g/10 min or greater, or 40 g/10 min or greater, while at the same time, 50.0 g/10 min or less, 40.0 g/10 min or less, 30.0 g/10 min or less, or 25.0 g/10 min or less, or 20.0 g/10 min or less, or 18.0 g/10 min or less, or 15.0 g/10 min or less, or 10.0 g/10 min or less, or 5.0 g/10 min or less, or 4.5 g/10 min or less, or 4.0 g/10 min or less, or 3.5 g/10 min or less, or 3.0 g/10 min or less, or 2.5 g/10 min or less, or 2.0 g/10 min or less, or 1.5 g/10 min or less, or 1.0 g/10 min or less as measured according to ASTM D1238.

The silane-grafted ethylene polymer has a silane content of 0.40 mol % to 1.50 mol % based on the total moles of the silane-grafted ethylene polymer. For example, the silane-grafted ethylene polymer may have a silane content of 0.40 mol % or greater, or 0.41 mol % or greater, or 0.42 mol % or greater, or 0.43 mol % or greater, or 0.44 mol % or greater, or 0.45 mol % or greater, or 0.46 mol % or greater, or 0.47 mol % or greater, or 0.48 mol % or greater, or 0.49 mol % or greater, or 0.50 mol % or greater, or 0.52 mol % or greater, or 0.54 mol % or greater, or 0.56 mol % or greater, or 0.58 mol % or greater, or 0.60 mol % or greater, or 0.62 mol % or greater, or 0.64 mol % or greater, or 0.66 mol % or greater, or 0.68 mol % or greater, or 0.70 mol % or greater, or 0.72 mol % or greater, or 0.74 mol % or greater, or 0.76 mol % or greater, or 0.78 mol % or greater, or 0.80 mol % or greater, or 0.82 mol % or greater, or 0.84 mol % or greater, or 0.86 mol % or greater, or 0.88 mol % or greater, or 0.90 mol % or greater, or 0.92 mol % or greater, or 0.94 mol % or greater, or 0.96 mol % or greater, or 0.98 mol % or greater, or 1.00 mol % or greater, or 1.10 mol % or greater, or 1.20 mol % or greater, or 1.30 mol % or greater, or 1.40 mol % or greater, while at the same time, 1.50 mol % or less, or 1.40 mol % or less, or 1.30 mol % or less, or 1.20 mol % or less, or 1.10 mol % or less, or 1.00 mol % or less, or 0.99 mol % or less, or 0.98 mol % or less, or 0.96 mol % or less, or 0.94 mol % or less, or 0.92 mol % or less, or 0.90 mol % or less, or 0.88 mol % or less, or 0.86 mol % or less, or 0.84 mol % or less, or 0.82 mol % or less, or 0.80 mol % or less or 0.78 mol % or less, or 0.76 mol % or less, or 0.74 mol % or less, or 0.72 mol % or less, or 0.70 mol % or less or 0.68 mol % or less, or 0.66 mol % or less, or 0.64 mol % or less, or 0.62 mol % or less, or 0.60 mol % or less or 0.58 mol % or less, or 0.56 mol % or less, or 0.54 mol % or less, or 0.52 mol % or less, or 0.50 mol % or less, or 0.49 mol % or less, or 0.48 mol % or less, or 0.47 mol % or less, or 0.46 mol % or less, or 0.45 mol % or less, or 0.44 mol % or less, or 0.43 mol % or less, or 0.42 mol % or less, or 0.41 mol % or less based on the total moles of the silane-grafted ethylene polymer.

The silane-grafted ethylene polymer may have a silane content of 1.8 wt % to 5.0 wt % based on a total weight of the silane-grafted ethylene polymer. For example, the silane content may be 1.8 wt % or greater, or 2.0 wt % or greater, or 2.2 wt % or greater, or 2.4 wt % or greater, or 2.6 wt % or greater, or 2.8 wt % or greater, or 3.0 wt % or greater, or 3.2 wt % or greater, or 3.4 wt % or greater, or 3.6 wt % or greater, or 3.8 wt % or greater, or 4.0 wt % or greater, or 4.2 wt % or greater, or 4.4 wt % or greater, or 4.6 wt % or greater, or 4.8 wt % or greater, while at the same time, 5.0 wt % or less, or 4.8 wt % or less, or 4.6 wt % or less, or 4.4 wt % or less, or 4.2 wt % or less or 4.0 wt % or less, or 3.8 wt % or less, or 3.6 wt % or less, or 3.4 wt % or less, or 3.2 wt % or less or 3.0 wt % or less, or 2.8 wt % or less, or 2.6 wt % or less, or 2.4 wt % or less, or 2.2 wt % or less or 2.0 wt % or less.

The polymeric composition may comprise from 10 wt % to 80 wt % of the silane-grafted ethylene polymer based on a total weight of the polymeric composition. For example, the polymeric composition may comprise the silane-grafted ethylene polymer at a concentration of 10 wt % or greater, or 12 wt % or greater, or 14 wt % or greater, or 15 wt % or greater, or 16 wt % or greater, or 17 wt % or greater, or 18 wt % or greater, or 19 wt % or greater, or 20 wt % or greater, or 21 wt % or greater, or 22 wt % or greater, or 23 wt % or greater, or 24 wt % or greater, or 25 wt % or greater, or 26 wt % or greater, or 27 wt % or greater, or 28 wt % or greater, or 29 wt % or greater, or 30 wt % or greater, or 35 wt % or greater, or 40 wt % or greater, or 45 wt % or greater, or 50 wt % or greater, or 55 wt % or greater, or 60 wt % or greater, or 65 wt % or greater, or 70 wt % or greater, or 75 wt % or greater, while at the same time, 80 wt % or less, or 75 wt % or less, or 70 wt % or less, or 65 wt % or less, or 60 wt % or less, or 55 wt % or less, or 50 wt % or less, or 45 wt % or less, or 40 wt % or less, or 35 wt % or less, or 30 wt % or less, or 29 wt % or less, or 28 wt % or less, or 27 wt % or less, or 26 wt % or less, or 25 wt % or less, or 24 wt % or less, or 23 wt % or less, or 22 wt % or less, or 21 wt % or less, or 20 wt % or less, or 19 wt % or less, or 18 wt % or less, or 17 wt % or less, or 16 wt % or less, or 15 wt % or less, or 14 wt % or less, or 13 wt % or less, or 12 wt % or less, or 11 wt % or less based on a total weight of the polymeric composition.

Flame-Retardant Filler

The flame-retardant filler can inhibit, suppress, or delay the production of flames. In some examples, the flame-retardant filler may be halogen-free. As used herein, "halogen-free" and like terms indicate that the flame-retardant filler is without or substantially without halogen content, i.e., contain less than 10,000 mg/kg of halogen as measured by ion chromatography (IC) or a similar analytical method. Halogen content of less than this amount is considered inconsequential to the efficacy of the flame-retardant filler as, for example, in a coated conductor.

Examples of the flame-retardant fillers suitable for use in the polymeric composition include, but are not limited to, halogenated materials, metal hydroxides, red phosphorous, ammonium polyphosphate, silica, alumina, titanium oxide, carbon nanotubes, talc, clay, organo-modified clay, calcium carbonate, zinc oxide, zinc molybdate, zinc sulfide, zinc borate, antimony trioxide, wollastonite, mica, ammonium octamolybdate, frits, hollow glass microspheres, intumescent compounds, expanded graphite, and combinations thereof. Halogen free examples of the flame-retardant filler may comprise at least one of magnesium hydroxide, aluminum trihydrate, calcium carbonate, hydrated calcium silicate, aluminum hydroxide and hydrated magnesium. Commercially available examples of flame-retardant fillers suitable for use in the polymeric composition include, but are not limited to, APYRAL™ 40CD available from Nabaltec AG, Schwandorf, Germany and FR-20-100 from Israel Chemicals Ltd. of Tel Aviv-Yafo, Israel.

The flame-retardant filler can optionally be surface treated (coated). The surface treatment may be done with a saturated or unsaturated carboxylic acid having 8 to 24 carbon atoms, or 12 to 18 carbon atoms, or a metal salt of the acid. Alternatively, the acid or salt can be merely added to the polymeric composition in like amounts rather than using the surface treatment procedure. Other surface treatments may include silanes, titanates, phosphates and zirconates may also be utilized. Other surface treatments not disclosed here may also be used.

The polymeric composition may comprise the flame-retardant filler in an amount from 10 wt % to 80 wt % based on a total weight of the polymeric composition. For example, the polymeric composition may comprise 10 wt % or greater, or 15 wt % or greater, or 20 wt % or greater, or 25 wt % or greater, or 30 wt % or greater, or 35 wt % or greater, or 40 wt % or greater, or 45 wt % or greater, or 50 wt % or greater, or 55 wt % or greater, or 60 wt % or greater, or 65 wt % or greater, or 70 wt % or greater, or 75 wt % or greater, while at the same time, 80 wt % or less, or 75 wt % or less, or 70 wt % or less, or 65 wt % or less, or 60 wt % or less or 55 wt % or less, or 50 wt % or less or 45 wt % or less, or 40 wt % or less or 35 wt % or less of the flame-retardant filler based on the total weight of the polymeric composition.

Silicone

The polymeric composition may comprise from 1 wt % to 5 wt % silicone (also referred to as polysiloxane). The silicone may be linear, branched, reactive and/or non-reactive. The silicone may be used in its natural form (including, but not limited to, polydimethylsiloxane and silicone gum), or as a masterbatch in a carrier polymer, or as a so-called "powder resin modifier" (for example, DOWSIL™ Si Powder Resin Modifiers) or as combinations thereof. For example, the polymeric composition may comprise the silicone at a concentration of 1 wt % or greater, or 1.5 wt % or greater, or 2 wt % or greater, or 2.5 wt % or greater, or 3 wt % or greater, or 3.5 wt % or greater, or 4 wt % or greater, or 4.5 wt % or greater, while at the same time, 20 wt % or less, or 15 wt % or less, or 10 wt % or less, 7 wt % or less, or 5 wt % or less, or 4.5 wt % or less, or 4.0 wt % or less, or 3.5 wt % or less, or 3.0 wt % or less, or 2.5 wt % or less, or 2.0 wt % or less, or 1.5 wt % or less based on the total weight of the polymeric composition.

Additives

The polymeric composition may include one or more additives. Nonlimiting examples of suitable additives include antioxidants, colorants, corrosion inhibitors, lubricants, silanol condensation catalysts, ultraviolet (UV) absorbers or stabilizers, anti-blocking agents, flame-retardants, coupling agents, compatibilizers, plasticizers, fillers, processing aids, and combinations thereof.

The polymeric composition may include an antioxidant. Nonlimiting examples of suitable antioxidants include phenolic antioxidants, thio-based antioxidants, phosphate-based antioxidants, and hydrazine-based metal deactivators. Suitable phenolic antioxidants include high molecular weight hindered phenols, methyl-substituted phenol, phenols having substituents with primary or secondary carbonyls, and multifunctional phenols such as sulfur and phosphorous-containing phenol. Representative hindered phenols include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate]. The polymeric composition may include pentaerythritol tetrakis(3-(3,5-di-tert-butyl-4-hydroxyphenyl)propionate), commercially available as Irganox™ 1010 from BASF. A nonlimiting example of a suitable methyl-substituted phenol is isobutylidenebis(4,6-dimethylphenol). A nonlimiting example of a suitable hydrazine-based metal deactivator is oxalyl bis(benzylidene hydrazide). The polymeric composition may contain from 0 wt %, or 0.001 wt %, or 0.01 wt %, or 0.02 wt %, or 0.05 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the polymeric composition.

The polymeric composition may include a silanol condensation catalyst, such as Lewis and Brønsted acids and bases. A "silanol condensation catalyst" promotes crosslinking of the silane functionalized polyolefin through hydrolysis and condensation reactions. Lewis acids are chemical species that can accept an electron pair from a Lewis base. Lewis bases are chemical species that can donate an electron pair to a Lewis acid. Nonlimiting examples of suitable Lewis acids include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. Nonlimiting examples of suitable Lewis bases include the primary, secondary and tertiary amines. Nonlimiting examples of suitable Brønsted acids are methanesulfonic acid, benzenesulfonic acid, dodecylbenzenesulfonic acid, naphthalenesulfonic acid, or an alkylnaphthalenesulfonic acid. The silanol condensation catalyst may comprise a blocked sulfonic acid. The blocked sulfonic acid may be as defined in US 2016/0251535 A1 and may be a compound that generates in-situ a sulfonic acid upon heating thereof, optionally in the presence of moisture or an alcohol. Examples of blocked sulfonic acids include amine-sulfonic acid salts and sulfonic acid alkyl esters. The blocked sulfonic acid may consist of carbon atoms, hydrogen atoms, one sulfur atom, and three oxygen atoms, and optionally a nitrogen atom. These catalysts are typically used in moisture cure applications. The polymeric composition includes from 0 wt %, or 0.001 wt %, or 0.005 wt %, or 0.01 wt %, or 0.02 wt %, or 0.03 wt % to 0.05 wt %, or 0.1 wt %, or 0.2 wt %, or 0.5 wt %, or 1.0 wt %, or 3.0 wt %, or 5.0 wt % or 10 wt % silanol condensation catalyst, based on the total weight of the polymeric composition. The silanol condensation catalyst is typically added to the article manufacturing-extruder (such as during cable manufacture) so that it is present during the final melt extrusion process. As such, the silane functionalized polyolefin may experience some crosslinking before it leaves the extruder with the completion of the crosslinking after it has left the extruder, typically upon exposure to moisture (e.g., a sauna, hot water bath or a cooling bath) and/or the humidity present in the environment in which it is stored, transported or used.

The silanol condensation catalyst may be included in a catalyst masterbatch blend with the catalyst masterbatch being included in the composition. Nonlimiting examples of suitable silanol condensation catalyst masterbatches include those sold under the trade name SI-LINK™ from The Dow Chemical Company, including SI-LINK™ DFDB-5480 NT, SI-LINK™ DFDA-5481 NT and SI-LINK™ AC DFDA-5488 NT. In an embodiment, the composition contains from 0 wt %, or 0.001 wt %, or 0.01 wt %, or 0.5 wt %, or 1.0 wt %, or 2.0 wt %, or 3.0 wt %, or 4.0 wt % to 5.0 wt %, or 6.0 wt %, or 7.0 wt %, or 8.0 wt %, or 9.0 wt %, or 10.0 wt %, or 15.0 wt %, or 20.0 wt % silanol condensation catalyst masterbatch, based on total weight of the composition.

The polymeric composition may include an ultraviolet (UV) absorber or stabilizer. A nonlimiting example of a suitable UV stabilizer is a hindered amine light stabilizer (HALS). A nonlimiting example of a suitable HALS is 1,3,5-Triazine-2,4,6-triamine, N,N-1,2-ethanediylbisN-3-4,6-bisbutyl(1,2,2,6,6-pentamethyl-4-piperidinyl)amino-1,3,5-triazin-2-ylaminopropyl-N,N-dibutyl-N,N-bis(1,2,2,6,6-pentamethyl-4-piperidinyl)-1,5,8,12-tetrakis[4,6-bis(n-butyl-n-1,2,2,6,6-pentamethyl-4-piperidylamino)-1,3,5-triazin-2-yl]-1,5,8,12-tetraazadodecane, which is commercially available as SABO™ STAB UV-119 from SABO S.p.A. of Levate, Italy. In an embodiment, the composition contains from 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.2 wt %, or 0.3 wt %, or 0.4 wt %, or 0.5 wt %, 1.0 wt %, or 2.0 wt %, or 2.5 wt %, or 3.0 wt % UV absorber or stabilizer, based on total weight of the composition.

The composition may include a processing aid. Nonlimiting examples of suitable processing aids include oils, organic acids (such as stearic acid), and metal salts of organic acids (such as zinc stearate). In an embodiment, the composition contains from 0 wt %, or 0.01 wt %, or 0.02 wt %, or 0.05 wt %, or 0.07 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt %, or 5.0 wt %, or 10.0 wt %, or 20.0 wt % processing aid, based on total weight of the composition.

The composition may contain from 0 wt % or greater, or 0.001 wt % or greater, or 0.002 wt % or greater, or 0.005 wt % or greater, or 0.006 wt % or greater, or 0.008 wt % or greater, or 0.009 wt % or greater, or 0.01 wt % or greater, or 0.2 wt % or greater, or 0.3 wt % or greater, or 0.4 wt % or greater, or 0.5 wt % or greater, or 1.0 wt % or greater, or 2.0 wt % or greater, or 3.0 wt % or greater, or 4.0 wt % or greater, or 5.0 wt % or greater, or 10.0 wt % or greater, or 15.0 wt % or greater, or 20.0 wt % or greater, or 30 wt % or greater, or 40 wt % or greater, or 50 wt % or greater additive, based on the total weight of the polymeric composition.

Masterbatch

One or more of the silane-grafted ethylene polymer, flame-retardant, and additives may be combined as a pre-mixed masterbatch. Such masterbatches are commonly formed by dispersing the flame-retardant and additives into an inert plastic resin. Masterbatches are conveniently formed by melt compounding methods.

One or more of the components or masterbatches may be dried before compounding or extrusion, or a mixture of components or masterbatches is dried after compounding or extrusion, to reduce or eliminate potential scorch that may be caused from moisture present in or associated with the component, e.g., filler. The compositions may be prepared in the absence of a silanol condensation catalyst for extended shelf life, and the silanol condensation catalyst may be added as a final step in the preparation of a cable construction (coated conductor) by extrusion processes.

Coated Conductor

The present disclosure also provides a coated conductor. The coated conductor includes a conductor and a coating on the conductor, the coating including the polymeric composition. The polymeric composition is at least partially disposed around the conductor to produce the coated conductor. The conductor may comprise a conductive metal.

The process for producing a coated conductor includes mixing and heating the polymeric composition to at least the melting temperature of the silane-grafted ethylene polymer in an extruder to form a polymeric melt blend, and then coating the polymeric melt blend onto the conductor. The term "onto" includes direct contact or indirect contact between the polymeric melt blend and the conductor. The polymeric melt blend is in an extrudable state.

The polymeric composition is disposed around on and/or around the conductor to form a coating. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the conductor. The coating may directly contact the conductor. The coating may directly contact an insulation layer surrounding the conductor.

The coated conductor may exhibit a FWCL value of less than 15 cm*% as determined below. For example, the coated conductor may exhibit a Filler Weighted Char Length value of 0.5 cm*% or greater, or 1 cm*% or greater, or 2 cm*% or greater, or 3 cm*% or greater, or 4 cm*% or greater, or 5 cm*% or greater, or 6 cm*% or greater, or 7 cm*% or greater, or 8 cm*% or greater, or 9 cm*% or greater, or 10 cm*% or greater, or 11 cm*% or greater, or 12 cm*% or greater, or 13 cm*% or greater, or 14 cm*% or greater, while at the same time, less than 15 cm*%, or 14 cm*% or less, or 13 cm*% or less, or 12 cm*% or less, or 11 cm*% or less, or 10 cm*% or less, or 9 cm*% or less, or 8 cm*% or less, or 7 cm*% or less, or 6 cm*% or less, or 5 cm*% or less, or 4 cm*% or less, or 3 cm*% or less, or 2 cm*% or less, or 1 cm*% or less.

EXAMPLES

Test Methods

VTMS Content of Si-g-PE: The VTMS content of the Si-g-PE was measured using Neutron Activation Analysis (NAA). Samples were prepared from portions of Si-g-PE that have been vacuum stripped at 55° C. for 24 hours. Si standards were prepared from their NIST traceable standard solution into similar vials. The standards were diluted to a similar volume as the samples using pure water. A blank sample of the water was also prepared. The samples, standards and a blank were then analyzed following standard NAA procedure "Global-SOP-01101.02" for Si. Specifically, irradiation during the NAA was done for 3 minutes at 250 kW reactor power. The waiting time was 9 minutes and the counting time was 270 seconds using an HPGe detector set. The Si concentrations were calculated in weight percent using Canberra software and comparative technique. Typical uncertainty in the measurement ranges from 2% to 5% relative and the detection limit is less than 90 ppm. The VTMS contents, in wt %, were back calculated using stoichiometry, assuming that the measured Si by NAA is all from VinyTrimethoxySilane that was added ($C_5H_{12}O_3Si$). Knowing the wt % VTMS, as well as wt % of ethylene and any other comonomers used to make the ethylenic polymer (e.g, octene, ethyl acrylate), the mol % VTMS was calculated using the following formula:

$$\text{mol \%}_{VTMS} = \frac{\frac{w_{VTMS}}{M_{VTMS}}}{\sum_i \frac{w_i}{M_i}} \times 100$$

Where,
W=wt %
M=molecular weight
i=VTMS, ethylene, octene, ethyl acrylate.

FWCL value: The FWCL value of a coated conductor is determined by first performing International Electrotechnical Commission test 60332-1-2:2004 that specifies the procedure for testing the resistance to vertical flame propagation for a single vertical coated conductor. Test 60332-1-2:2004 measures a length of char ("char length") formed on the coated conductor during the test. The FWCL value is calculated by multiplying the char length in centimeters by the wt % of flame-retardant filler present in the polymeric composition that is used to form the coated conductor divided by 100.

Materials

The materials used in the examples are provided below.

POE1 is an ethylene polymer made with 1-octene (10.3 mol %) as a comonomer having a density of 0.88 g/cc as measured according to ASTM D792 and 18 g/10 minute melt index at 190° C./2.16 kg measured according to ASTM D1238. POE1 has a polar comonomer content of 0 wt %. POE1 is commercially available from The Dow Chemical Company, Midland, MI.

POE2 is an ethylene polymer made with 1-octene (5.6 mol %) as the comonomer having a density of 0.902 g/cc as measured according to ASTM D792 and a 30 g/10 minute melt index at 190° C./2.16 kg as measured according to ASTM D1238. POE2 has a polar comonomer content of 0 wt %. POE2 is commercially available from The Dow Chemical Company, Midland, MI.

Polar PE1 is an ethylene polymer made with ethyl acrylate as a comonomer (18 wt % of ethyl acrylate) having a 6 g/10 minute melt index at 190° C./2.16 kg as measured according to ASTM D1238. Polar PE1 has a polar comonomer content of 18 wt %. Polar PE1 is commercially available from The Dow Chemical Company, Midland, MI.

Polar PE2 is an ethylene polymer made with ethyl acrylate as a comonomer (21 wt % of ethyl acrylate) having a 21 g/10 minute melt index at 190° C./2.16 kg as measured according to ASTM D1238. Polar PE2 has a polar comonomer content of 21 wt %. Polar PE2 is commercially available from The Dow Chemical Company, Midland, MI.

LDPE is a low density polyethylene (ethylene polymer) having a density of 0.918 g/cc density as measured according to ASTM D792 and 8 g/10 minute melt index at 190° C./2.16 kg as measured according to ASTM D1238. LDPE has a polar comonomer content of 0 wt %. LDPE is commercially available from The Dow Chemical Company, Midland, MI.

Vinyltrimethoxysilane (VTMS) CAS number 2768-02-7 is 98% pure and is commercially available from Sigma-Aldrich, St. Louis, MO.

2,5-Bis(tert-butylperoxy)-2,5-dimethylhexane (DBPH) CAS number 78-63-7 is a peroxide commercially available from Sigma-Aldrich, St. Louis, MO.

SC is a silanol condensation catalyst masterbatch developed to be used in conjunction with moisture curable ethylene-silane copolymers and is commercially available as SI-LINK™ DFDB-5480 NT from The Dow Chemical Company, Midland, MI OBC is an olefin block copolymer having a density of 0.877 g/cc as measured according to ASTM D792 and a 15 g/10 minute melt index at 190° C./2.16 kg as measured according to ASTM D1238. OBC is commercially available as INFUSE™ 9817 from The Dow Chemical Company, Midland, MI.

Compatibilizer is a maleic anhydride grafted ethylene vinyl acetate copolymer and is commercially available as FUSABOND™ C250 from The Dow Chemical Company, Midland, MI.

Filler is magnesium hydroxide (HFFR) and is commercially available as FR-20-100 from Israel Chemicals Ltd. of Tel Aviv-Yafo, Israel.

AO1 is a sterically hindered phenolic antioxidant having the chemical name pentaerythritol tetrakis(3-(3,5-di-tert-butyl-4-hydroxyphenyl)propionate), which is commercially available as IRGANOX™ 1010 from BASF, Ludwigshafen, Germany.

AO2 is distearyl thiodipropionate and is commercially available as NAUGARD™ DSTDP from Addivant, Danbury, CT.

OBH is Oxalyl bis (benzylidene) hydrazide and is commercially available from Sigma-Aldrich, St. Louis, MO.

Silicone is DOWSIL™ Si Powder Resin Modifier 4-7081 and is commercially available from The Dow Chemical Company, Midland, MI.

OTS is Octyltriethoxysilane and is commercially available as PROSIL™ 9202 from SiVance LLC, of Milliken & Co.

Sample Preparation

The silane functionalization of the ethylene polymer was performed in a 26 mm co-rotating twin screw extruder (ZSK-26 from Coperion Corp.). The extruder was configured with 15 barrels (60 L/D). The maximum screw speed was 1200 revolutions per minute ("rpm"), and the maximum motor output was 40 horsepower. The extruder was equipped with "loss-in-weight feeders" to feed the base resins. For all samples, the silane (VTMS) and DBPH (peroxide) were pre-blended at a 20:1 ratio by weight and metered into the extruder using an Eldex metering at Barrel 5. The run rate was 4.54 kg/hr, and the screw speed was 300 rpm. The barrel temperatures were set at 150° C. for barrels 2-4, 230° C. for barrels 6-10, 190° C. for barrels 11-12, 160° C. for barrels 12-15 and the adaptor/die. Nitrogen at 10-15 standard cubic feet per hour was used to purge the first barrel section to maintain an inert atmosphere and minimize oxidation. A vacuum (50795.8 pascals) was pulled on Barrel 13. A 2 hole die was used to produce strands which were cut into pellets using a strand cutter. The silane grafted materials were then dried using nitrogen for approximately 4-6 hours in a hood and vacuum sealed in aluminum foiled bags to avoid any exposure to moisture and stored for further testing. Graft level was measured on vacuum stripped samples using Neutron Activation Analysis (NAA). Table 1 provides the silane content of the silane functionalized ethylene polymers used in the Examples.

TABLE 1

| | Formulation | | | Si-g-PE: Test Results | |
|---|---|---|---|---|---|
| Base Resin | Base Resin, wt % | VTMS:DBPH (20:1) wt % | Designation | Silane Content (Grafted VTMS), mol % | Melt Index (190° C., 2.16 kg) dg/min |
| POE1 | 97.60 | 2.40 | Si-g-POE1 | 0.39 | 17.7 |
| POE1 | 97.15 | 2.85 | Si-g-POE1 | 0.51 | 11.9 |
| POE1 | 96.60 | 3.40 | Si-g-POE1 | 0.64 | 15.0 |
| POE1 | 96.00 | 4.00 | Si-g-POE1 | 0.76 | 11.9 |
| POE1 | 95.00 | 5.00 | Si-g-POE1 | 0.94 | 14.0 |
| Polar PE1 | 95.00 | 5.00 | Si-g-Polar PE1 | 0.63 | 5.7 |
| Polar PE2 | 95.00 | 5.00 | Si-g-Polar PE2 | 0.60 | 19.3 |
| LDPE | 95.50 | 4.50 | Si-g-LDPE | 0.57 | 1.9 |
| POE2 | 95.50 | 4.50 | Si-g-POE2 | 0.75 | 21.9 |
| POE2 | 97.60 | 2.40 | Si-g-POE2 | 0.38 | 25.9 |

A flame-retardant masterbatch ("FRMB") is formed by combining the materials of Table 2. The FRMB was made by combining the magnesium hydroxide and other ingredients with the OBC in a BRABENDER™ mixer with cam blades at 40 rpm rotor speed and 160° C. jacket (mixing bowl set) temperature. Liquid additives of the FRMB were added after all other ingredients were homogeneously mixed. The FRMB was mixed for 15 minutes after flux, flattened in a press, cooled and cut into small pieces. The pieces were extruded in a 25:1 single screw extruder with dual mixing head at 40 rpm with 150° C./160° C./170° C./180° C. profile, 20/40/60 US mesh/inch screen pack, and the resulting strand was cut into small pellets.

TABLE 2

| Material | Weight Percentage (%) |
|---|---|
| OBC | 18.29 |
| Compatibilizer | 5.00 |
| Filler | 70.00 |
| AO1 | 0.38 |
| AO2 | 0.38 |
| OBH | 0.45 |

TABLE 2-continued

| Material | Weight Percentage (%) |
|---|---|
| Silicone | 5.00 |
| OTS | 0.50 |
| Total | 100.00 |

Before the wire preparation, all the masterbatches were dried in vacuum oven: the FR MB pellets were left in 60° C. oven for 48 hour to remove moisture. The silane-grafted ethylene polymer, FRMB, and the silanol condensation catalyst were then physically blended at specific proportions shown in Table 3. The blend was then melt mixed during extrusion to make wire constructions on 10 AWG solid copper with a nominal 1.524 millimeters wall thickness. The wire-preparation unit included a BRABENDER™ 19.05 mm extruder with variable speed drive, a 24:1 polyethylene screw without any mixing head, a BRABENDER™ crosshead wire die, lab water cooling trough with air wipe, a laser micrometer, and a variable speed wire puller. The wire samples were extruded at 40 rpm screw speed and nearly 2.44 meters per minute take-up speed with a temperature profile of 140° C./155° C./165° C./165° C. (across zone 1, zone 2, zone 3 and head/die) and a 40/40 mesh screen pack.

The extruded coated conductors were cured in a 90° C. water bath for two days. After further conditioning at 23° C. and 50% relative humidity for 72 hours, the cured coated conductors were tested according to International Electrotechnical Commission test 60332-1-2:2004 and the FWCL value was calculated.

Results

Table 3 provides the composition of comparative examples ("CE") 1-6 and inventive examples ("IE") 1-10 as well as the associated FWCL values.

As can be seen from Table 3, it has been surprisingly discovered that the measured FWCL value is a function of the silane content (grafted VTMS) of the Si-g-PE used to make the polymeric composition as well as the type of ethylene polymer used to make the Si-g-PE. Surprisingly, when polar PE1 or polar PE2 is used to make the Si-g-PE, substantially inferior burn performance of the coated conductor is obtained (as reflected in FWCL values 15 cm*% or greater. Further surprisingly discovered is that below 0.40 mol % silane content, the coated conductor exhibits a FWCL value of 15 cm*% or greater, while silane content above 0.40 mol % yields a FWCL value less than 15 cm*% (when polar PE1 or polar PE2 is not the Si-g-PE), indicating that 0.40 mol % is a critical silane content. FWCL values of less than 15 cm*% are obtained for grafted VTMS (silane content) values up to 0.94 mol % (when polar PE1 or polar PE2 is not the Si-g-PE) and the relationship is believed to extend up to 1.50 mol %.

What is claimed is:

1. A polymeric composition, comprising:
10 wt % to 30 wt % of a silane-grafted ethylene polymer based on a total weight of the polymeric composition, wherein silane-grafted ethylene polymer has a silane content of 0.52 mol % to 1.50 mol % based on a total moles of the silane-grafted ethylene polymer and the ethylene polymer used to make the silane-grafted ethylene polymer has a melt index of 10 to 50 g/10 min. at 190° C./2.16 kg measured according to ASTM D1238, a polar comonomer content of less than 15 wt % based on a total weight of the ethylene polymer and wherein the silane content in mol % is calculated from the wt % of a silane compound used in the silane-grafted ethylene polymer and the wt % of all chemical compounds used to make the silane-grafted ethylene polymer according to:

TABLE 3

| | CE1 | CE2 | CE3 | CE4 | CE5 | CE6 | IE1 | IE2 | IE3 | IE4 | IE5 | IE6 | IE7 | IE8 | IE9 | IE10 |
|---|---|---|---|---|---|---|---|---|---|---|---|---|---|---|---|---|
| Si-g-POE1 | 0 | 0 | 18 | 0 | 0 | 0 | 18 | 18 | 18 | 18 | 21 | 24 | 27 | 18 | 0 | 0 |
| Si-g-POE2 | 0 | 0 | 0 | 18 | 18 | 21 | 0 | 0 | 0 | 0 | 0 | 0 | 0 | 0 | 18 | 0 |
| Si-g-Polar PE1 | 18 | 0 | 0 | 0 | 0 | 0 | 0 | 0 | 0 | 0 | 0 | 0 | 0 | 0 | 0 | 0 |
| Si-g Polar PE2 | 0 | 18 | 0 | 0 | 0 | 0 | 0 | 0 | 0 | 0 | 0 | 0 | 0 | 0 | 0 | 0 |
| Si-g-LDPE | 0 | 0 | 0 | 0 | 0 | 0 | 0 | 0 | 0 | 0 | 0 | 0 | 0 | 0 | 0 | 18 |
| FRMB | 77 | 77 | 77 | 77 | 77 | 74 | 77 | 77 | 77 | 77 | 74 | 71 | 68 | 77 | 77 | 77 |
| SC | 5 | 5 | 5 | 5 | 5 | 5 | 5 | 5 | 5 | 5 | 5 | 5 | 5 | 5 | 5 | 5 |
| Total | 100 | 100 | 100 | 100 | 100 | 100 | 100 | 100 | 100 | 100 | 100 | 100 | 100 | 100 | 100 | 100 |
| Grafted VTMS (Silane Content) (mol %) | 0.63 | 0.60 | 0.39 | 0.38 | 0.38 | 0.38 | 0.51 | 0.64 | 0.76 | 0.76 | 0.76 | 0.76 | 0.76 | 0.94 | 0.75 | 0.57 |
| HFFR Filler Weight (%) | 53.9 | 53.9 | 53.9 | 53.9 | 53.9 | 51.8 | 53.9 | 53.9 | 53.9 | 53.9 | 51.8 | 51.8 | 47.6 | 53.9 | 53.9 | 53.9 |
| Char Length (cm) | 50 | 38 | 27 | 50 | 40 | 34 | 11 | 16 | 12.5 | 8 | 10 | 12.5 | 14 | 13.5 | 13.5 | 13 |
| FWCL Test (cm* %) | 27 | 20 | 15 | 27 | 22 | 18 | 6 | 9 | 7 | 4 | 5 | 6 | 7 | 7 | 7 | 7 |

$$\text{mol }\%_{silane} = \frac{\frac{w_{silane}}{M_{silane}}}{\sum_i \frac{w_i}{M_i}} \times 100$$

where, w=wt %, M=molecular weight, i=chemical compound used to make the silane-grafted ethylene polymer;
  1 wt % to 5 wt % silicone based on a total weight of the polymeric composition; and
  65 wt % to 80 wt % of a flame-retardant filler based on a total weight of the polymeric composition.

2. The polymeric composition of claim 1, further comprising 0.001 wt % to 10.0 wt % of a silanol condensation catalyst based on a total weight of the polymeric composition.

3. The polymeric composition of claim 1, wherein the silane-grafted ethylene polymer has a silane content of 0.52 mol % to 0.94 mol % based on a total moles of the silane-grafted ethylene polymer.

4. The polymeric composition of claim 1, wherein the silane-grafted ethylene polymer has a density of 0.860 g/cc to 0.930 g/cc as measured according to ASTM D-792.

5. The polymeric composition of claim 1, wherein the flame-retardant filler is a halogen free flame-retardant filler.

6. The polymeric composition of claim 1, wherein the silane graft of the silane-grafted ethylene polymer is a unit derived from a hydrolysable silane monomer of the general formula:

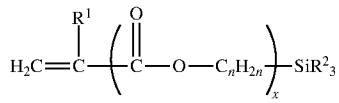

in which $R^1$ is a hydrogen atom or methyl group; x is 0 or 1; n is an integer from 1 to 4, or 6, or 8, or 10, or 12; and each $R^2$ independently is a hydrolyzable organic group such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), an amino or substituted amino group (e.g., alkylamino, arylamino), or a lower-alkyl group having 1 to 6 carbon atoms, with the proviso that not more than one of the three $R^2$ groups is an alkyl.

7. The polymeric composition of claim 6, wherein the hydrolysable silane is selected from the group consisting of vinyltrimethoxy silane and vinyltriethoxy silane.

8. The polymeric composition of claim 1, wherein the flame-retardant filler comprises at least one of magnesium hydroxide, aluminum trihydrate, calcium carbonate, hydrated calcium silicate and hydrated magnesium.

9. A coated conductor, comprising:
  a conductor; and
  the polymeric composition of claim 1 positioned at least partially around the conductor, wherein the coated conductor exhibits a Filler Weighted Char Length criterion value of less than 15 cm*%.

10. The coated conductor of claim 9, wherein the Filler Weighted Char Length criterion value is from 1 cm*% to 10 cm*%.

11. The polymeric composition of claim 1, wherein the silane-grafted ethylene polymer has a melt index of 10 to 30 g/10 min.

12. The polymeric composition of claim 1, wherein the silane-grafted ethylene polymer has a silane content of 0.58 mol % to 0.94 mol % based on a total moles of the silane-grafted ethylene polymer.

13. The polymeric composition of claim 1, wherein the polymeric composition includes 10 wt % to 28 wt % of the silane-grafted ethylene polymer; and
  70 wt % to 80 wt % of the flame-retardant filler, wherein the wt % value are based on the total weight of the polymeric composition.

14. The polymeric composition of claim 1, wherein the polymeric composition includes 10 wt % to 25 wt % of the silane-grafted ethylene polymer; and
  70 wt % to 80 wt % of the flame-retardant filler, wherein the wt % value are based on the total weight of the polymeric composition.

* * * * *